March 5, 1940. J. P. PEDERSON Re. 21,381
PAPER MAKING MACHINE
Original Filed April 10, 1931 3 Sheets-Sheet 1
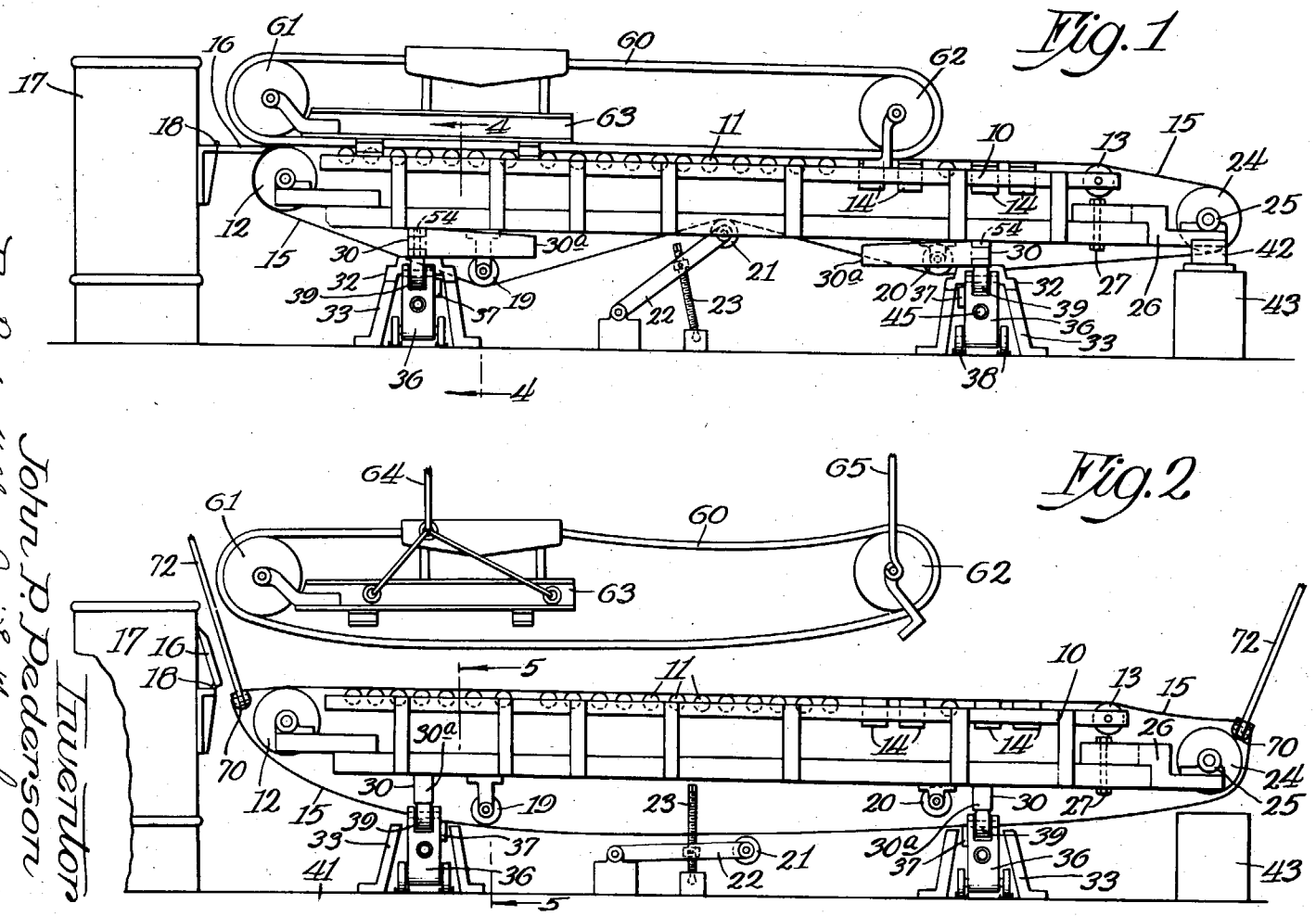
Inventor
John P. Pederson
By Rector, Hibben, Davis & Macauley, Attys.

March 5, 1940. J. P. PEDERSON Re. 21,381

PAPER MAKING MACHINE

Original Filed April 10, 1931 3 Sheets-Sheet 2

Inventor
John P. Pederson
By Rector, Hibben, Davis & Macauley, Attys.

March 5, 1940 J. P. PEDERSON Re. 21,381

PAPER MAKING MACHINE

Original Filed April 10, 1931 3 Sheets-Sheet 3

Inventor:
John P. Pederson
By Rector, Hibben, Davis & Macauley, Attys.

Reissued Mar. 5, 1940

Re. 21,381

UNITED STATES PATENT OFFICE 21,381

PAPER MAKING MACHINE

John P. Pederson, Battle Creek, Mich.

Original No. 1,937,125, dated November 28, 1933, Serial No. 529,087, April 10, 1931. Application for reissue August 1, 1939, Serial No. 287,845

37 Claims. (Cl. 92—44)

This invention relates to improvements in paper making machines and is particularly adapted for use with machines of the Fourdrinier type in which an endless woven wire screen is employed. The principal object of the invention is to provide a Fourdrinier machine, constituting a part of a paper making machine, which will permit the replacement of the endless woven wire screen of the sheet forming part of the machine in a manner which greatly reduces the danger of injury to the wire screen and results in a great saving in time and labor, as compared with the methods heretofore in use. A further object of the invention is to provide an improved method of operating and manipulating a Fourdrinier paper making machine for the purpose of removing the woven wire screen therefrom and placing such a screen thereon. The present invention has the further advantage that it is simple in construction, capable of being readily manufactured, and permits the changing of the woven wire screen to be simply and easily accomplished.

In paper making machines of this class, the endless wire screen of the Fourdrinier machine must be replaced frequently, and, as is well known, practically all of the machine must be dismantled, or the massive machine must be moved bodily in a lateral direction from its normal position to permit the removal and replacement of the screen, thus requiring in this operation the removal of many rolls, suction boxes, trays and the like, either individually, or as a unit, and the subsequent replacement of these parts. In replacing the screens in this manner, it not infrequently happens that a heavy roll or part of the machine is dropped, with the result that a new wire screen is destroyed in addition to causing further delay in the changing of the screen and the making of repairs. There is also the additional loss of production of paper, amounting to many tons during the period of a year, because the life of a woven wire screen is comparatively short, being from one to eight weeks and averaging about two or three weeks, and it requires from two to four hours of time to change the screen of a machine when the parts are removed in sections or individually, and about 25% additional time when the Fourdrinier machine is moved laterally as a unit. In some forms of paper making machines, the Fourdrinier or wet end of the machine has been specially constructed so that one or more parts, carrying the operative elements of the machine, are capable of being rolled out of the machine frame to provide access to the working parts so that an old wire screen can be removed and a new screen substituted, after which the parts of the machine may be rolled back into their normal positions in proper association with the new screen. Such improvements are, however, objectionable because they require the separation of the operative parts of the machine and because such a construction is costly and complicated and the handling of the wire screen is difficult even with the aid of the special appliances for handling the screen. In other forms of machines, porter bars or extension bars are attached to one side of the Fourdrinier, the wire screen is mounted thereon, and then lifting jacks are placed under the ends of these porter bars for the purpose of raising the Fourdrinier from the pedestals on which one side is supported so that the wire screen can be moved into place. Such improvements are objectionable in that these porter bars are necessarily so large and cumbersome to handle, if they are to have sufficient strength, that they set up stresses in the machine, especially if the machine is relatively wide, and in that the operation of removing and replacing the wire screen with their use is not capable of being carried on conveniently and rapidly.

The present invention overcomes the difficulties incident to the prior methods and apparatus referred to above and is distinguished by the fact that all of the working parts of the Fourdrinier machine remain in their normal positions during the removal and replacement of the endless wire screen. This movement of the screen with the frame and working parts of the Fourdrinier machine substantially in their normal positions is accomplished through the provision of a movable support for the frame and working parts, this support being capable of movement laterally of the screen while at the same time continuing to perform its supporting function so that the endless screen can be displaced from its position surrounding the Fourdrinier and its working parts without any lateral movement of the Fourdrinier and without the necessity of performing manual operations upon heavy and cumbersome parts. In its preferred embodiment, the invention comprises means for providing a movable support for the frame and working parts of the Fourdrinier machine and also an auxiliary support for one end of the couch roll of the machine so that during the movement of the movable support the enveloping screen, which passes around the rolls and other moving parts of the Fourdrinier, including the couch roll, may move endwise of these rolls, laterally of the machine, without interference by any of the parts which normally support the side of the machine at which the removal and replacement occurs. A further feature of the invention is that upon lateral movement of the movable support for the frame and working parts of the Fourdrinier machine, an upward pressure is imparted to that side of the machine toward which movement takes place so that the supporting blocks of the machine may then be removed in case such supporting blocks are employed in addition to the movable support of the present invention. A further object of the invention is to provide a Fourdrinier machine having the frame and working parts thereof mounted on rigid supports at one side of the machine and also upon movable carriages capable of being moved laterally on tracks at the other side of the machine so that these carriages can be moved laterally in substantial synchronism with the movement of the endless wire screen until a part of each carriage reaches a position where it supports the machine in a position beyond the center thereof from the rigid supports, after which the frame and working parts are held in stable position during the further movement of the screen. The frame of the machine is preferably provided with lateral extensions which may serve to coact with parts of the movable carriages until these carriages have passed outwardly to a position wherein they provide a stable support for the machine, after which these extensions may be moved inwardly to normal positions in order not to interfere with the further free movement of the endless screen. These and other objects and advantages of the invention, relating to details of construction and improved features of the method, will appear more fully hereinafter.

The nature of the invention will be understood from the following specification taken with the accompanying drawings, in which Fig. 1 is a side elevation of the Fourdrinier portion of a paper making machine embodying the improvements of the present invention, the parts being shown in their normal operating positions;

Fig. 2 is a side elevation of the machine illustrated in Fig. 1 after the parts thereof have been adjusted to permit removal of the endless wire screen;

Figure 3:
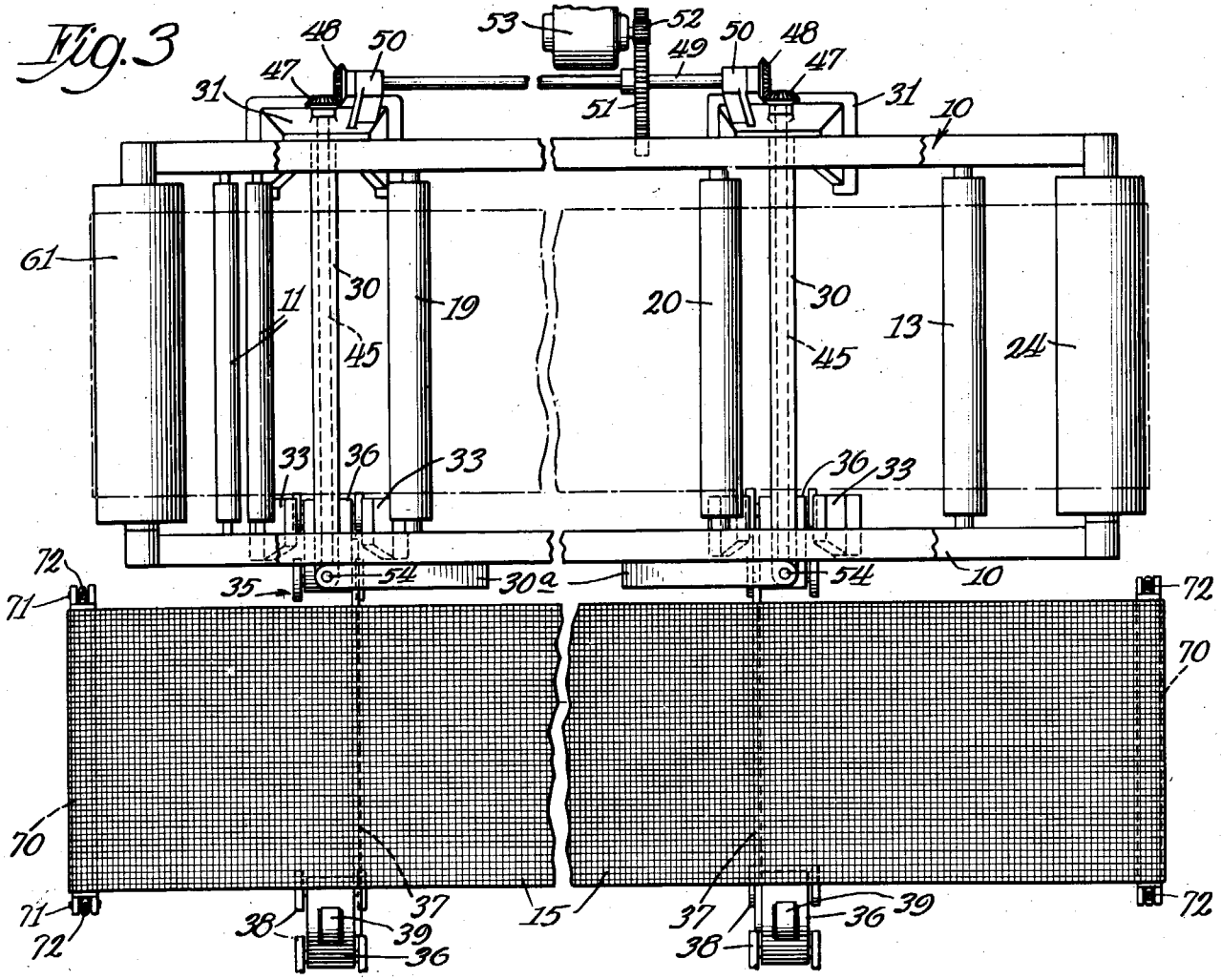
Fig. 3 is a top plan view of the machine illustrated in Figs. 1 and 2 with the endless wire screen removed and occupying a position at one side of the machine.

Although the improvements of the present invention are capable of being applied to various forms of machines, including various forms of paper machines of the Fourdrinier type, it has been illustrated in the accompanying drawings, by way of example, in connection with one form of Fourdrinier machine which has been shown somewhat diagrammatically without attempting to illustrate all those details which do not have any direct bearing on the present invention. As illustrated in the drawings, the invention is shown as being embodied in a machine comprising a frame 10 in which are journaled the usual table rolls 11, breast roll 12 and guide rolls 13. This frame also carries suction boxes 14 and the usual trays and the like, located below the table of the frame, for collecting and receiving the water. The rolls 11 and 13 serve to support the upper stretch of the endless woven wire screen 15 which is usually formed of copper. The paper stock flows over the upper run of this endless woven wire screen and is discharged thereon from a screen board 16 which receives stock from the head box 17. The apron board 16 is hinged at 18 so that it may be swung upwardly when desired.

The lower run of the screen 15 is engaged by the guide rolls 19 and 20 and also by the tension guide roll 21 which is supported by pivoted arms 22 and capable of adjustment by devices 23 so that the tension exerted upon the screen may be varied to draw the screen taut to the desired extent. At the discharge end of the machine, the screen passes around the couch roll 24 which at one side of the machine is journaled in a stationary bearing while at the other side it is journaled in a bearing 25 carried by a bracket 26 which is adjustably mouned upon one end of the frame 10 by bolts 27.

Figure 4:
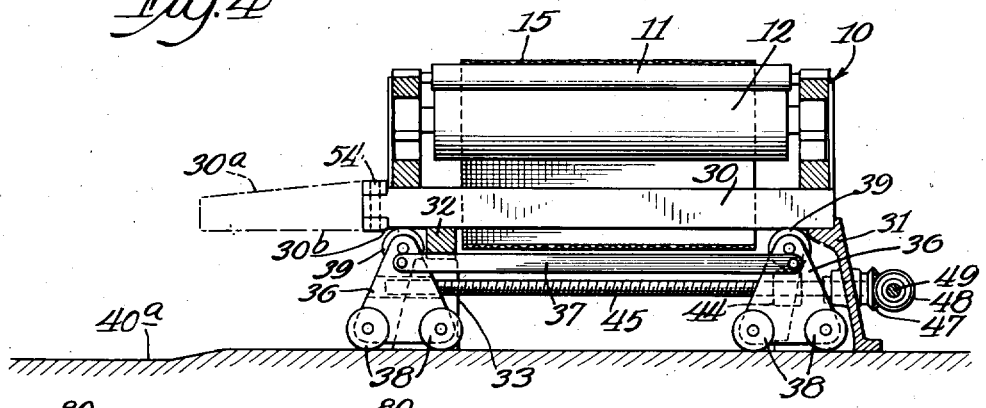
Fig. 4 is an enlarged sectional view taken on the line 4—4 of Fig. 1, showing, somewhat diagrammatically, the relation of the parts in their normal operating positions.
Figure 5:
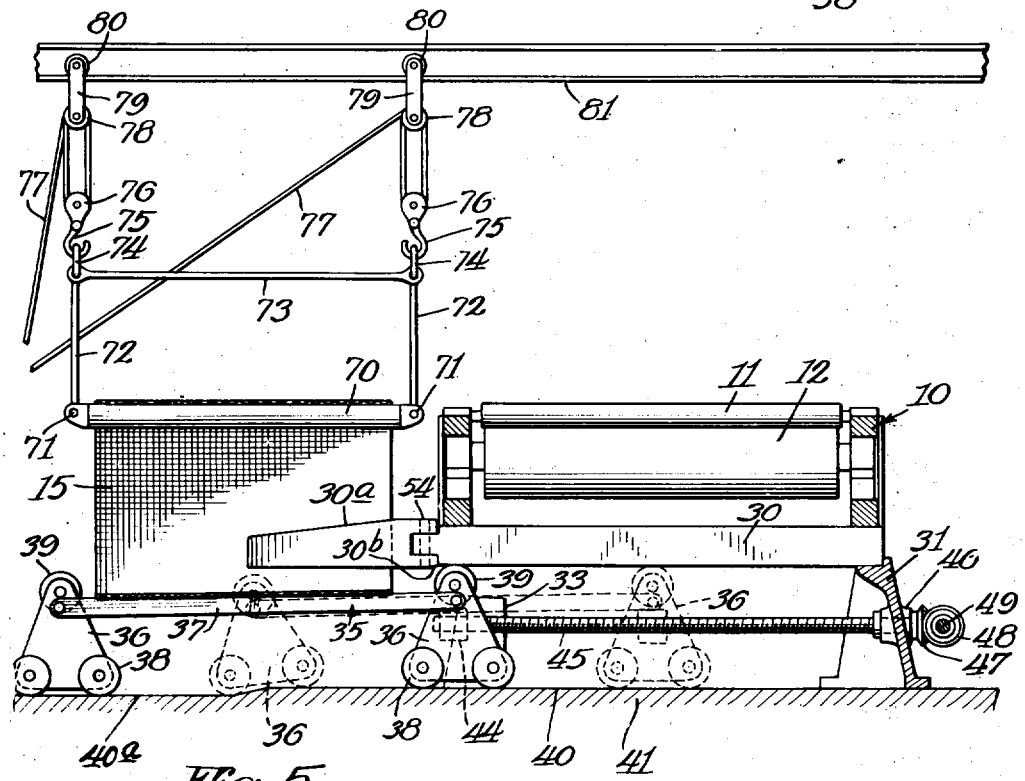
Fig. 5 is a sectional view taken on the line 5—5 of Fig. 2, showing the positions of the parts during and at the completion of the operation of removing the endless wire screen from the machine.

The main frame 10 of the machine is provided with cross frame members 30 which, on the far side of the machine, as shown in Figs. 4 and 5, are rigidly mounted on pedestals 31. At the forward side of the machine, these cross frame members may rest upon spacer blocks 32 which in turn are supported on stationary pedestals 33, thus providing a rigid support for the frame of the Fourdrinier machine during its operation. In addition to the supports just referred to, the frame 10 is provided with two supporting carriages 35 which comprise two wheeled sections 36 connected by a transverse bar 37. Each section 36 comprises a triangularly shaped truck frame or casting upon which are journaled two pairs of lower rollers 38 and an upper roller 39. The lower rollers 38, two of which are located on each side of each truck frame, are adapted to travel on trackways 40 formed in or carried by the concrete base 41 upon which the pedestals 31 and 33 are secured. The upper rollers 39 of each carriage section are adapted to coact with the under sides of the transverse frame members 30 of the frame 10, it being understood that one carriage 35 is located normally beneath each frame member 30. The bar 37 of each carriage is pivotally connected to the upper portions of the truck frames of the sections 36 of that carriage and when the carriages are in their innermost positions as shown in Figs. 1 and 4, the upper rollers 39 coact with the under sides of the bars 30 adjacent to the pedestals 31 and 33 so that the frame 10 is then supported by the carriages as well as by the pedestals and the spacer blocks 32. In a similar manner, the inner bearing of the couch roll 24 is mounted upon a fixed pedestal while the outer bearing may be supported by a spacer block 42 mounted upon a stationary pedestal 43. When the parts are in their normal positions as shown in Figs. 1 and 4, the endless wire screen 15 passes around the frame 10 and parts carried thereby and also around the couch roll 24 with the lower stretch thereof occupying a position above the bars 37 of the carriages and between the pedestals 31 and 33. These pedestals are recessed to receive the inner edges of the frames of the carriage sections when the carriages are in their innermost positions.

For the purpose of effecting lateral movement of the carriages 35 along the tracks 40 beneath the frame 10, the innermost carriage sections 36 are provided with blocks 44 which are threadedly engaged by right and left hand screws 45 journaled in bearings 46 carried by the pedestals 31. The projecting ends of these screw shafts 45 have bevel gears 47 fixed thereon to mesh with other bevel gears 48 which are secured on the ends of a longitudinal operating shaft 49. This shaft is journaled in bearings 50 carried by the pedestals 31 and the intermediate portion thereof has a gear 51 secured thereon to mesh with a driving pinion 52 fixed on the shaft of an electric motor 53. This motor is provided with a suitable starting device and controlling circuit, not illustrated, by which it may be operated in either direction, as desired, in order to effect the simultaneous rotation of the two screw shafts 45 for the purpose of moving the carriages 35 inwardly or outwardly with respect to the pedestals 31.

In order to provide a continuing support for the frame 10 of the Fourdrinier machine during the outward movement of the carriages 35, the transverse frame members 30 are provided with extensions 30*a* which are connected to the outer ends of these frame members by vertical pivots or hinges 54. The outer ends of the body portions of the frame members 30 are further provided with downwardly projecting cam surfaces 30*b*, for a purpose hereinafter described, and the lower surfaces of the extensions 30*a* of the frame members 30 may preferably be in the same plane with the lowermost part of the cam surfaces 30*b*.

When the rollers 39 of the outermost carriage sections 36 pass beneath the cam surfaces 30*b*, the upward force exerted upon the outermost edge of the frame 10 relieves the pressure upon the spacer blocks 32 and 42 and these blocks may be manually withdrawn from their positions on the pedestals 33 and 43. As the outward movement of the carriages 35 continues, the outer part of the frame 10 is supported by the engagement of the outermost carriage rollers 39 with the extensions 30*a* of the frame members which are then extended outwardly as shown by full lines in Fig. 4. As the outermost carriage sections 36 reach a position beneath the outer ends of the extensions 30*a* of the frame members, as shown by dotted lines in Fig. 5, the supporting rollers 38 of these outer carriage sections 36 pass downwardly onto a depressed portion 40*a* of the tracks, thus leaving a space between the outer rollers 39 and the same extensions 30*a* through which the endless woven wire screen 15 may be withdrawn laterally. By the time the outer rollers 39 reach this position, the innermost rollers 39 will have reached a position at or beyond the centers of the frame members 30 so that the frame 10 and the couch roll 24 will then be supported in a stable position without the presence of the spacer blocks 32 and 42 and without any support being provided by the rollers 39 of the outer carriage sections.

Above the table rolls 11 and the upper stretch of the wire screen 15, there are mounted the usual deckle straps 60 which pass around the guide wheels 61 and 62 which, with the deckle frame 63, are normally supported upon the main frame of the machine, as shown in Fig. 1, with the lower runs of the deckle straps traveling along the edges of the wire screen. This deckle strap structure may be elevated to a position above the screen of the table rolls, as shown in Fig. 2, this operation being effected in any suitable manner, as by a crane or hoisting apparatus provided with the hooked links 64 and 65 which may be detachably connected with the deckle frame and with the shaft of the rear guide roll 62, respectively, so that the apparatus may be suspended above the guide rolls and wire screen during the operation of removing and replacing the screen.

When the wire screen 15 is to be removed from the machine, the deckle straps and their guide rollers are elevated as shown in Fig. 2 and the feed table 16 is swung upwardly against the head box 17. After lowering the tension roller 21, as shown in Fig. 2, to relieve the tension on the wire screen 15, the auxiliary wire remover rolls 70 are inserted through the end portions of the endless wire screen 15 adjacent the breast roll 12 and the couch roll 24. These auxiliary wire remover rolls 70 are each mounted as shown particularly in Fig. 5, where each roll is shown connected to a traveling hoist. After each roll 70 is inserted through the endless wire apron, the ends of the roll are connected by pins 71 to hangers 72 which extend downwardly from a spacing rod 73 having rings 74 mounted at the ends thereof for connection with hooks 75 depending from the tackle blocks 76. These tackle blocks are provided with the usual pulleys and the hoisting cables 77 are passed around these pulleys and also around the pulleys 78 which are carried by hangers 79 provided with rollers 80 arranged to travel on the track rails 81 extending transversely of and above the machine. After the auxiliary remover rolls 70 have been inserted, the operators of the machine pull upon the cables 77 to elevate the end portions of the endless wire screen 15 out of contact with the breast roll and the couch roll, as shown in Fig. 2. The next step in the operation of preparing to remove the wire screen 15 is to swing the auxiliary frame members 30*a* outwardly to the positions shown by dotted lines in Fig. 4. The electric motor 53 is then started in a direction to cause the supporting carriages 35 to move outwardly toward the screen removal side of the machine and, at the same time, the operator moves the hoisting apparatus, by which the remover rolls 70 are supported, along the rails 81, in the same direction. As the outermost rollers 39 of the carriages 35 engage the cam surfaces 30*b* of the frame members 30, the frame 10 is elevated slightly at its outer side as permitted by the slight resiliency of this frame, notwithstanding its rigid support upon the pedestals 31, thereby relieving the pressure upon the spacer blocks 32 which are then removed. It will be appreciated that when the frame 10 is lifted as rollers 39 pass under the cam surfaces 30*b*, that the bearing bracket 26 which supports one end of the couch roll is also lifted. The lifting of bracket 26 releases the pressure on spacer block 42 so that it may be removed leaving the outer end of the couch roll supported entirely by bracket 26. A free passage is thus left for the lateral movement of the wire screen over the couch roll. If the spacer blocks 32 or the frame members 30 are connected to the pedestals 33, these connections will, of course, be released to permit the removal of these spacer blocks. The operator then continues the outward movement of the carriages 35 by the operation of the motor 53 while simultaneously continuing the outward movement of the wire screen, supported on the auxiliary rolls 70, and during this movement the lower stretch of this screen passes over the upper ends of the pedestals 33 while at the same time the outer portion of the frame 10 and parts carried thereby are supported by the engagement of the outer carriage rollers 39 with the under sides of the frame extensions 30*a*. When a point is reached where the innermost supporting rollers 39 have reached points slightly beyond the centers of the frame members 30, measured outwardly from the pedestals 31, the frame 10 will be supported in stable position by the inner rollers 39 of the carriages and the pedestals 31 without the necessity of deriving any support from the outer rollers 39 of the carriages. The tracks 40 are therefore so arranged that, at this point in the movement of the carriages, the outer carriage sections 36 pass downwardly onto the depressed portions 40a of the tracks as shown by the dotted line position of the carriage 35 in Fig. 5, thus providing a space between the outermost rollers 39 and the auxiliary frame members 30a which may then be swung inwardly about their pivots 54 to the positions shown by full lines in Figures 3 and 4. There is then provided a free passage for the outward movement of the wire screen 15 and the operator then continues the outward movement of the carriages 35 and the outward movement of the remover rolls 70 until the carriages 35 reach the position shown by full lines in Fig. 5. The rolls 70 and the wire screen 15 then occupy positions entirely at one side of the frame 10 and the parts carried thereby so that the hoisting apparatus may be operated to lower the rolls 70 until the wire screen rests upon the bars 37 of the carriages. The rolls 70 are then removed from the hoisting apparatus and withdrawn from the wire screen to permit its removal and a new endless wire screen is then unrolled in position over the bars 37 of the carriages preparatory to placing this new screen on the machine. This is accomplished by inserting the rolls 70 through the new screen, elevating the end portions of the screen by the hoisting apparatus until these end portions align with the breast roll 12 and the couch roll 24, and then reversing the movement of the hoisting apparatus along the rails 81 and the movement of the carriages 35 along the tracks 41 to cause the new screen to move laterally and enclose the frame 10 and parts carried thereby, as well as the couch roll 24. As this inward movement of the screen progresses, the frame extensions 30a are swung outwardly into alignment with the body portions of these frame members so that when the screen has passed beyond the ends of these extensions 30a, these extensions will be engaged by the outer rollers 39 as the outer carriage sections 36 ride upwardly onto the elevated portions of the tracks 40. The inward movement of the screen is continued in synchronism with the inward movement of the carriages 35 with the outer rollers 39 supporting the frame extensions 30a and during this time, or while the outer rollers 39 are in engagement with the cam surfaces 30b, the spacer blocks 32 and 42 are replaced upon the pedestals 33 and 43, respectively, so that, when the carriages 35 reach their final inner positions, shown in Fig. 4, the outer portion of the frame 10 is lowered automatically onto the spacer blocks 32, and the bracket 26 is lowered onto the spacer block 42, as the outer rollers 39 pass out of engagement with the cam surfaces. The frame extensions 30a are then folded inwardly to the positions shown by full lines in Fig. 4 and the deckle strap structure is lowered to the normal position shown in Fig. 1, after having lowered the apron board 16. The tension roller 21 is then elevated to put the wire screen under tension and the parts are again in readiness for operation. Of course, where the wire screen is to be discarded after removal, it may be cut transversely on the machine while it is still occupying a position over the table rolls 11, in order to facilitate its removal without the necessity of employing the remover rolls 70, although, in many instances, it may be preferable to use the remover rolls 70 regardless of the disposition which is to be made of the screen which is removed.

It will be apparent that this invention provides a method of removing an endless wire screen from a machine, such as a paper machine of the Fourdrinier type, without lateral movement of the machine itself and without disassembling any of the parts of the machine, except for the removal of the spacer blocks 32 and 42. It may be found desirable to eliminate the use of the outer pedestals 33 and the spacer blocks 32, depending entirely upon the carriages 35 for supporting the outer portion of the machine during its normal operation and depending upon the connection of the frame 10 with the pedestals 31 for preventing any vibration or movement of the machine. In that event, the lateral movement of the auxiliary carriages and of the hoisting apparatus for removing the screen may be begun without the removal of any supports for the frame but with the removal of the spacer block 42 which may preferably be employed in order to provide a firm support for the outer end of the carriage roll during its normal operation.

Although one method of practicing the present invention has been illustrated and described in connection with the application of the invention to one particular form of Fourdrinier paper machine, it will be understood that the invention may be applied to machines of this and other types, and may be practiced in various ways, within the scope of the appended claims.

I claim:

1. The method of removing an endless wire screen from a machine of the Fourdrinier type, which consists in providing a movable support and a stationary support for the machine, and moving the movable support laterally with the screen while supporting the machine thereby.

2. The method of removing an endless wire screen from a machine of the Fourdrinier type, which consists in providing a movable support and a stationary support for the machine, and moving the movable support laterally with the screen while maintaining the machine in fixed connection with said stationary support and supported by the movable support.

3. The method of removing an endless wire screen from a machine of the Fourdrinier type, which consists in providing a movable support and a stationary support for the machine, and moving the movable support laterally with the screen until the screen is free of the machine while maintaining the support of said machine by said movable support.

4. The method of removing an endless wire screen from a machine of the Fourdrinier type, which consists in providing a stationary support for one side of the frame of the machine and a movable support engaging said frame at two points on opposite sides of the lower run of said screen, and moving said screen and said movable support laterally of said frame until said screen is free of said machine.

5. The method of removing an endless wire screen from a machine of the Fourdrinier type, which consists in providing a stationary support for one side of said machine and a movable support having machine supporting parts straddling the lower run of said screen, and simultaneously moving said screen and said movable support laterally of said machine while maintaining the support of said machine by said stationary support and said movable support.

6. The method of applying an endless wire screen to a machine of the Fourdrinier type, which consists in supporting said machine on one side by stationary supports and on the other side by a movable support having a pair of machine supporting parts between which said screen is placed, and then moving said movable support and said screen inwardly until both of said supporting parts are in supporting engagement with said machine and until said endless screen envelops said machine.

7. The method of removing an endless wire screen from a machine of the Fourdrinier type, which consists in raising the deckle straps and associated parts above the roll supporting frame and the rolls thereof, releasing the tension in the endless screen and raising the end portions thereof from the breast roll and couch roll of the machine, supporting said machine on one side by a stationary support and on the other side by stationary and movable supports, removing the stationary supports from said other side of said machine to provide a free opening for the passage of said screen, and then moving said screen laterally through said opening and simultaneously moving said movable support to maintain the support of said machine on said other side.

8. The method of successively removing and replacing an endless wire screen from a machine of the Fourdrinier type, which consists in raising the deckle straps and associated parts above the roll supporting frame and the rolls thereof, releasing the tension in the endless screen and raising the end portions thereof from the breast roll and couch roll of the machine, supporting said machine on one side by a stationary support and on the other side by stationary and movable supports, removing the stationary supports from said other side of said machine to provide a free opening for the passage of said screen, then moving said screen laterally through said opening and simultaneously moving said movable support to maintain the support of said machine on said other side, then replacing the removed screen by a new endless screen, then moving said new screen and said movable support inwardly until said screen encloses the rolls and frame of said machine, then setting up tension in said screen, and restoring said deckle straps and associated parts to their normal operating positions.

9. A machine of the Fourdrinier type comprising a frame having a breast roll, guide rollers and suction boxes mounted thereon, a couch roll located at one end of said frame, stationary supports for one side of said frame and one end of said couch roll, stationary supports for the other side of said frame and the other end of said couch roll including removable parts adapted to provide a free passage through which an endless wire screen may be removed or inserted into a position surrounding said rolls and rollers, and a movable support for and beneath said frame adapted to travel transversely of said frame to provide a continuing support for said other side thereof during the operation of removing and replacing said endless wire screen.

10. A machine of the Fourdrinier type comprising a frame having a breast roll, guide rollers and suction boxes mounted thereon, a couch roll located at one end of said frame, stationary supports for one side of said frame and one end of said couch roll, stationary supports for the other side of said frame and the other end of said couch roll including removable parts adapted to provide a free passage through which an endless wire screen may be removed or inserted into a position surrounding said rolls and rollers, a movable support for and beneath said frame adapted to travel transversely of said frame to provide a continuing support for said other side thereof during the operation of removing and replacing said endless wire screen, and an extension for said frame adapted to maintain the support of said frame on said movable support when said movable support and said wire screen have been projected beyond the ends of said rolls.

11. A machine of the Fourdrinier type comprising a frame having a breast roll, guide rollers and suction boxes mounted thereon, a couch roll located at one end of said frame, stationary supports for one side of frame and one end of said couch roll, stationary supports for the other side of said frame and the other end of said couch roll including removable parts adapted to provide a free passage through which an endless wire screen may be removed or inserted into a position surrounding said rolls and rollers, and a movable carriage mounted normally beneath said frame and having parts on opposite sides of the lower run of said wire screen adapted to support said frame, said carriage being adapted to be moved laterally of said machine simultaneously with the movement of said wire screen for maintaining the support of said frame at the side thereof on which said wire screen is removed and replaced.

12. A machine of the Fourdrinier type comprising a frame having a breast roll, guide rollers and suction boxes mounted thereon, a couch roll located at one end of said frame, stationary supports for one side of said frame and one end of said couch roll, stationary supports for the other side of said frame and the other end of said couch roll including removable parts adapted to provide a free passage through which an endless wire screen may be removed or inserted into a position surrounding said rolls and rollers, a movable carriage mounted normally beneath said frame and having parts on opposite sides of the lower run of said wire screen adapted to support said frame, said carriage being adapted to be moved laterally of said machine simultaneously with the movement of said wire screen for maintaining the support of said frame at the side thereof on which said wire screen is removed and replaced, and a hinged extension for said frame adapted to be moved outwardly to cooperate with said carriage when said carriage is projected beyond the ends of the rolls of said machine.

13. A machine of the Fourdrinier type comprising a frame having a breast roll, guide rollers and suction boxes mounted thereon, a couch roll located at one end of said frame, stationary supports for one side of said frame and one end of said couch roll, stationary supports for the other side of said frame and the other end of said couch roll including removable parts adapted to provide a free passage through which an endless wire screen may be removed or inserted into a position surrounding said rolls and rollers, a movable support for and beneath said frame adapted to travel transversely of said frame to provide a continuing support for said other side thereof during the operation of removing and replacing said endless wire screen, and means for supporting said other end of said couch roll upon said frame after the removable portion of its stationary support has been withdrawn.

14. A machine of the Fourdrinier type comprising a frame having a breast roll, guide rollers and suction boxes mounted thereon, a couch roll located at one end of said frame, stationary supports for one side of said frame and one end of said couch roll, stationary supports for the other side of said frame and the other end of said couch roll including removable parts adapted to provide a free passage through which an endless wire screen may be removed or inserted into a position surrounding said rolls and rollers, a movable support for and beneath said frame adapted to travel transversely of said frame to provide a continuing support for said other side thereof during the operation of removing and replacing said endless wire screen, and a bracket mounted on said frame and carrying a bearing in which is journaled the end of said couch roll over which said wire screen is removed and replaced.

15. A machine of the Fourdrinier type comprising a frame having a breast roll, guide rollers and suction boxes mounted thereon, a couch roll located at one end of said frame, stationary supports for one side of said frame and one end of said couch roll, means for continuously supporting on said frame the other end of said couch roll while a forming screen is being moved laterally over said couch roll and said frame, and means for supporting the other side of said frame.

16. A machine of the Fourdrinier type comprising a frame having a breast roll, guide rollers and suction boxes mounted thereon, a couch roll located at one end of said frame, stationary supports for one side of said frame and one end of said couch roll, means for continuously supporting on said frame the other end of said couch roll during movement of a forming wire laterally of the machine, pedestals located beneath the other side of said frame and the other end of said couch roll, and spacer blocks inserted between said pedestals and said frame and said means.

17. A machine of the Fourdrinier type comprising a frame having a breast roll, guide rollers and suction boxes mounted thereon, a couch roll located at one end of said frame, stationary supports for one side of said frame and one end of said couch roll, means for continuously supporting on said frame the other end of said couch roll during movement of a forming wire laterally of the machine, pedestals located beneath the other side of said frame and the other end of said couch roll, spacer blocks inserted between said pedestals and said frame and said means, and means for releasing the pressure of said frame and said first named means upon said spacer blocks to permit the removal and replacement of said blocks.

18. A machine of the Fourdrinier type comprising a frame carrying operating parts of said machine, said frame and said parts being adapted to be surrounded by an endless wire screen, means for supporting said frame at one side of said wire screen, pedestals located at the other side of said frame, spacer blocks interposed between said pedestals and said frame, a pair of carriages movable transversely of said frame and adapted to provide an auxiliary support for said frame during their movement, and power operated means for effecting the simultaneous movement of said carriages transversely of said frame.

19. A machine of the Fourdrinier type comprising a frame carrying operating parts of said machine, said frame and said parts being adapted to be surrounded by an endless wire screen, means for supporting said frame at one side of said wire screen, pedestals located at the other side of said frame, spacer blocks interposed between said pedestals and said frame, a pair of carriages movable transversely of said frame and adapted to provide an auxiliary support for said frame during their movement, means for moving said carriages transversely of said frame, and means actuated by the movement of said carriages for relieving the pressure of said frame upon said spacer blocks.

20. A machine of the Fourdrinier type comprising a frame carrying operating parts of said machine, said frame and said parts being adapted to be surrounded by an endless wire screen, means for supporting said frame at one side of said wire screen, pedestals located at the other side of said frame, spacer blocks interposed between said pedestals and said frame, a pair of carriages movable transversely of said frame and adapted to provide an auxiliary support for said frame during their movement, said carriages having supporting parts engaging said frame on opposite sides of the lower run of said wire screen, means for simultaneously moving said carriages and said wire screen transversely of said frame after said spacer blocks have been removed, extensions for said frame adapted to rest on said carriages after said carriages have been projected beyond the side of said frame, and means for causing parts of said carriages to be depressed at predetermined points to provide openings between the outer portions of said carriages and said frame extensions.

21. The combination with a machine of the Fourdrinier type, of means for supporting one side of said machine, and a movable support for and beneath the other side of said machine adapted to permit the removal laterally of an endless wire screen carried by said machine, said last named support being mounted for movement laterally of said machine simultaneously with said endless wire screen and having means engaging said other side for maintaining a moving point of support for said other side of said machine.

22. The combination with a machine of the Fourdrinier type including a frame, of means for supporting one side of said frame in a fixed position, a movable support for and beneath the other side of said frame laterally movable to permit the removal laterally of an endless wire screen carried by said machine, and rollers carried by said movable support and coacting with said frame of said machine.

23. A machine of the Fourdrinier type including a frame carrying operating parts of said machine, said frame and said parts being adapted to be surrounded by an endless wire screen, said frame being supported in a fixed position by supports on one side, a laterally movable support for and beneath the other side of said frame, a track for said movable support, and rollers carried by said movable support to coact with said track and said frame.

24. The combination with a machine of the Fourdrinier type including a frame carrying operating parts of said machine, said frame and said parts being adapted to be surrounded by an endless wire screen, of means for supporting said frame at one side of said screen, and a movable support movable transversely of said machine and having parts engaging said frame on opposite sides of the lower run of said screen.

25. The combination with a machine of the Fourdrinier type including a frame carrying operating parts of said machine, said frame and said parts being adapted to be surrounded by an endless wire screen, of means for supporting said frame at one side of said screen, and a carriage movable transversely of said machine and having rollers engaging said frame on opposite sides of the lower run of said screen.

26. The combination with a machine of the Fourdrinier type including a frame carrying operating parts of said machine, said frame and said parts being adapted to be surrounded by an endless wire screen, of means for supporting said frame at one side of said screen, a support movable transversely of said frame, a track for said support, rollers carried by said last named support to travel on said track, and other rollers carried by said last named support to coact with said frame on opposite sides of the lower run of said wire screen.

27. The method of removing an endless wire from a machine of the Fourdrinier type which consists in providing supports for opposite sides of the machine and effecting relative separation of said supports laterally of the machine while continuously supporting the machine from said supports, said separation being accomplished simultaneously with the lateral movement of said wire with respect to said machine.

28. The combination with a machine of the Fourdrinier type having a frame, of means for supporting one side of said machine, and a movable support for the other side of said machine and beneath said frame adapted to permit the removal laterally of an endless wire screen carried by said machine, said last named support being in continuous engagement with said frame and mounted for movement laterally of said machine at all times without lifting the machine from said means which supports one side of the machine and having means engaging said other side and movable simultaneously with said endless wire screen for maintaining a moving point of support for said other side of said machine.

29. The combination with a machine of the Fourdrinier type having a frame, of means for supporting one side of said machine, and a movable support for the other side of said machine and beneath said frame adapted to permit the removal laterally of an endless wire screen carried by said machine, said last named support being in continuous engagement with said frame and mounted for movement laterally of said machine without lifting the machine from said means which supports one side of the machine and being movable simultaneously with said endless wire screen and having means engaging said other side for maintaining a moving point of support for said other side of said machine, said movable support having a driving means associated therewith to effect said lateral movement and said movable support serving as the permanent supporting means for the other side of the machine during the operation thereof.

30. The combination with a machine of the Fourdrinier type, of means for supporting one side of said machine, and a movable support for and beneath the other side of said machine adapted to permit the removal laterally of an endless wire screen carried by said machine, said last named support being mounted for movement laterally of said machine without lifting the machine from said means which supports one side of the machine and being movable simultaneously with said endless wire screen and having means engaging said other side for maintaining a moving point of support for said other side of said machine, trackways for said movable support, and rollers on said support engaging said trackways.

31. The combination with a machine of the Fourdrinier type, of means for supporting one side of said machine, and a movable support for the other side of said machine adapted to permit the removal laterally of an endless wire screen carried by said machine, said last named support being mounted for movement laterally of said machine without lifting the machine from said means which supports one side of the machine and being movable simultaneously with said endless wire screen while maintaining a moving point of support for said machine, said movable support comprising inner and outer trackway engaging rollers, a bar disposed across the space between said rollers and carried thereby, said bar serving to support the lower run of said wire during the lateral movement of the movable support.

32. The combination with a machine of the Fourdrinier type including a frame carrying operating parts of said machine, said frame and said parts being adapted to be surrounded by an endless wire screen, of means for supporting said frame at one side of said screen, and a movable support beneath said frame and movable transversely of said machine and having parts engaging said frame on opposite sides of the lower run of said screen, said engaging parts of the support and frame contacting as the movable support is moved to and from position beneath the machine.

33. The combination with a machine of the Fourdrinier type including a frame carrying operating parts of said machine, said frame and said parts being adapted to be surrounded by an endless wire screen, of fixed means for supporting said frame at one side of said screen, and a movable support beneath said frame and movable transversely of said machine and having parts engaging said frame on opposite sides of the lower run of said screen as the movable support is moved to and from position beneath the machine, said movable support serving as a permanent support for one side of the frame while the machine is in operation.

34. The combination with a machine of the Fourdrinier type including a frame carrying operating parts of said machine, said frame and said parts being adapted to be surrounded by an endless wire screen, of means for supporting said frame at one side of said screen, and a movable support beneath said frame and movable transversely of said machine and having parts engaging said frame on opposite sides of the lower run of said screen as the movable support is moved to and from position beneath the machine, said movable support including means serving as a permanent support for one side of the frame while the machine is in operation and said engaging parts maintaining a moving point of support for said other side of said machine as said support is moved transversely, said movement being obtainable without lifting the frame from its supporting means at said one side of the screen.

35. The combination with a machine of the Fourdrinier type including a frame carrying operating parts of said machine, said frame and said parts being adapted to be surrounded by an endless wire screen, of fixed means for supporting said frame at one side of said screen, and a movable support beneath said frame and movable transversely of said machine and having parts engaging said frame on opposite sides of the lower run of said screen as the movable support is moved to and from position beneath the machine, said movable support including means serving as a permanent support for one side of the frame while the machine is in operation and said engaging parts maintaining a moving point of support for said other side of said machine which point shifts from one side to the other of the lower run of the wire as said support is moved transversely, drive means to obtain said transverse movement without lifting the frame from its supporting means at said one side of the screen.

36. The combination with a machine of the Fourdrinier type including a frame carrying operating parts of said machine, said frame and said parts being adapted to be surrounded by an endless wire screen, of means for supporting said frame at one side of said screen, and a movable support movable transversely of said machine and having parts engaging said frame on opposite sides of the lower run of said screen, trackways for said movable support and rollers on said support engaging said trackways, said movable support being movable transversely without lifting the frame from its supporting means at said one side of the screen and said last named support maintaining a moving point of support for said machine.

37. The combination with a machine of the Fourdrinier type including a frame carrying operating parts of said machine, said frame and said parts being adapted to be surrounded by an endless wire screen, of means for supporting said frame at one side of said screen, and a movable support movable transversely of said machine and having parts engaging said frame on opposite sides of the lower run of said screen, said movable support comprising inner and outer trackway engaging rollers, a bar disposed across the span between said rollers and carried thereby, said bar serving to support the lower run of said wire during the transverse movement of the movable support, said movable support maintaining a moving point of support for said machine, and said transverse movement being obtainable without lifting the frame from its supporting means at said one side of the screen.

JOHN P. PEDERSON.